May 10, 1927.  
J. L. STOWERS  
1,627,580  
DEVICE FOR OPENING AND CLOSING WINDOWS, SHUTTERS, AND SIMILAR APPLIANCES  
Filed July 26, 1924  
6 Sheets-Sheet 1
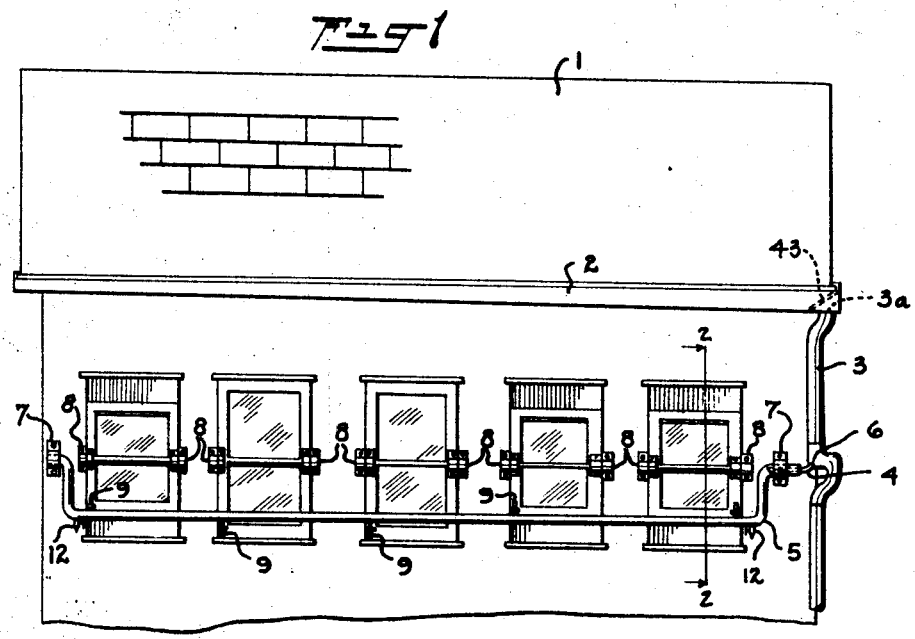
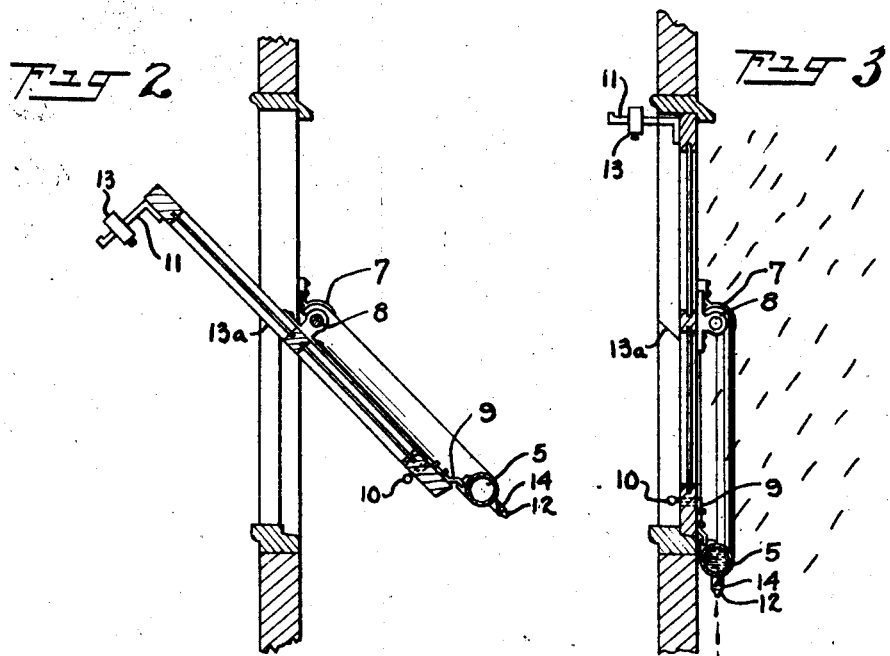
John L. Stowers, INVENTOR  
BY  
James J. Walton,  
ATTORNEY.

May 10, 1927.
J. L. STOWERS
1,627,580
DEVICE FOR OPENING AND CLOSING WINDOWS, SHUTTERS, AND SIMILAR APPLIANCES
Filed July 26, 1924     6 Sheets-Sheet 2
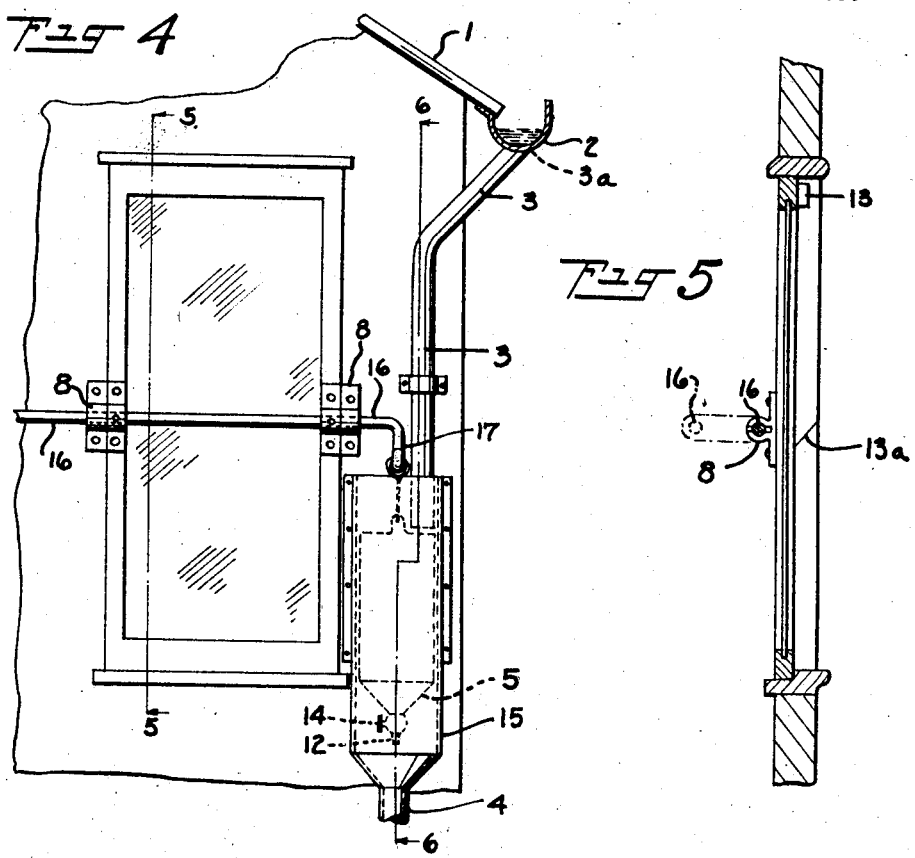
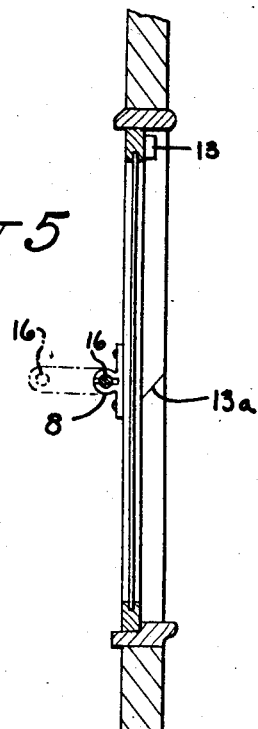
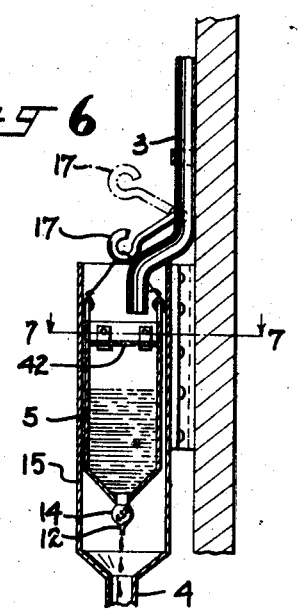
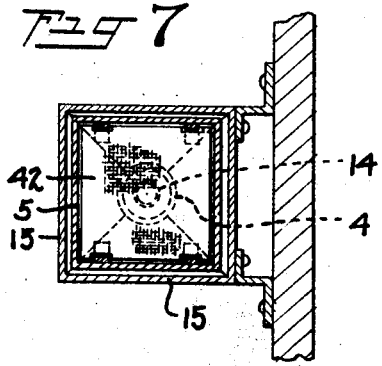
John L. Stowers, INVENTOR,
BY James L. Watson, ATTORNEY.

May 10, 1927.
J. L. STOWERS
1,627,580
DEVICE FOR OPENING AND CLOSING WINDOWS, SHUTTERS, AND SIMILAR APPLIANCES
Filed July 26, 1924   6 Sheets-Sheet 3
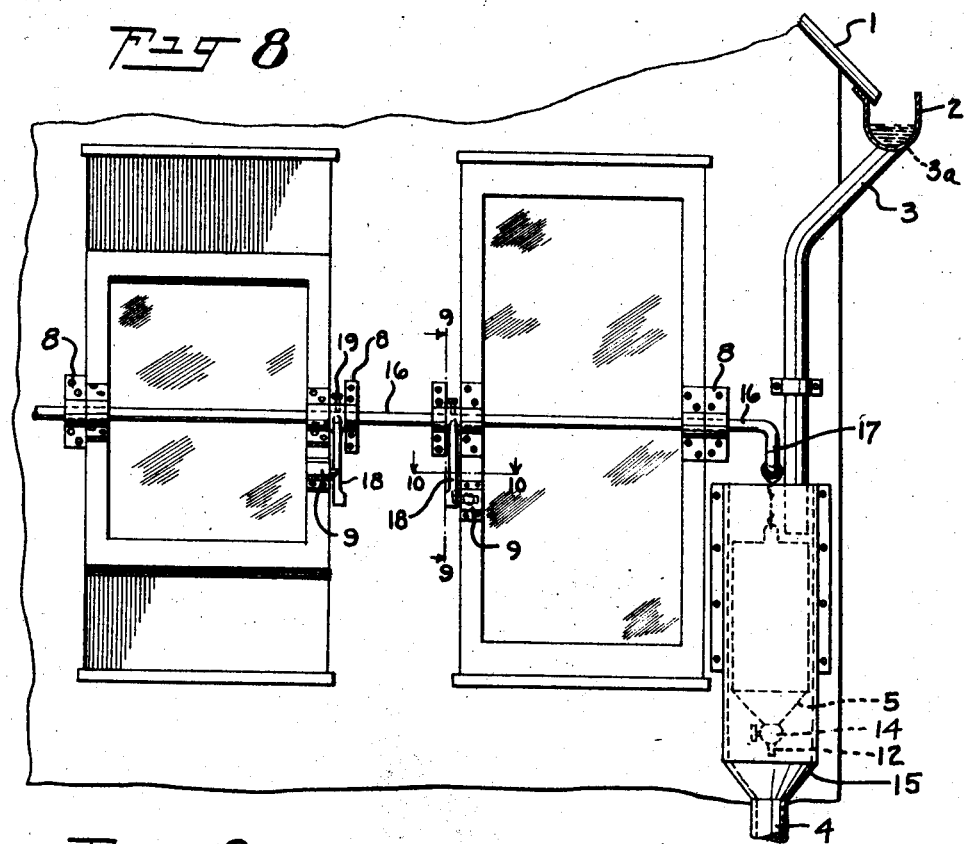
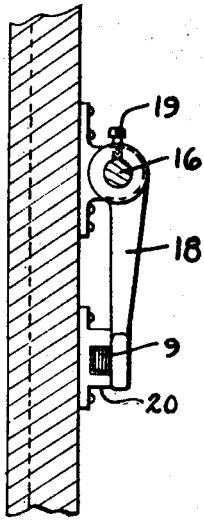
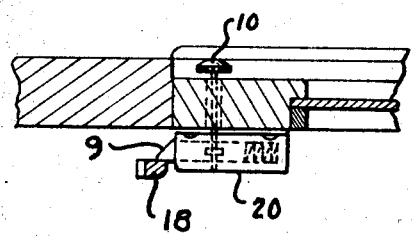
John L. Stowers INVENTOR
BY
James J. Watson.
ATTORNEY

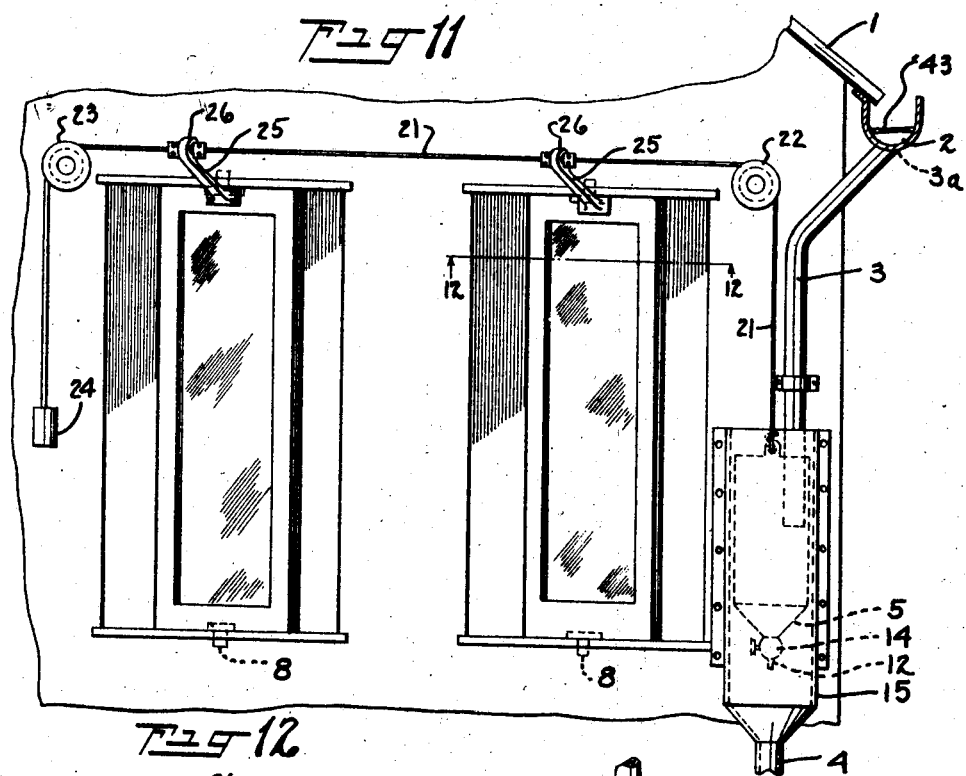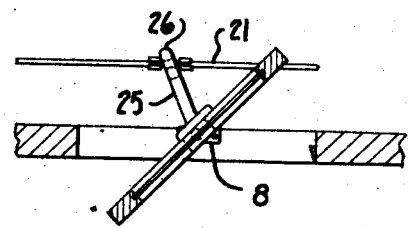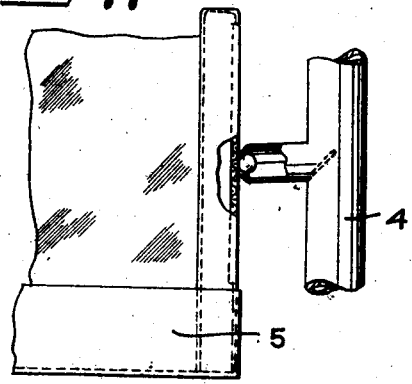

May 10, 1927.
J. L. STOWERS
1,627,580
DEVICE FOR OPENING AND CLOSING WINDOWS, SHUTTERS, AND SIMILAR APPLIANCES
Filed July 26, 1924     6 Sheets-Sheet 5
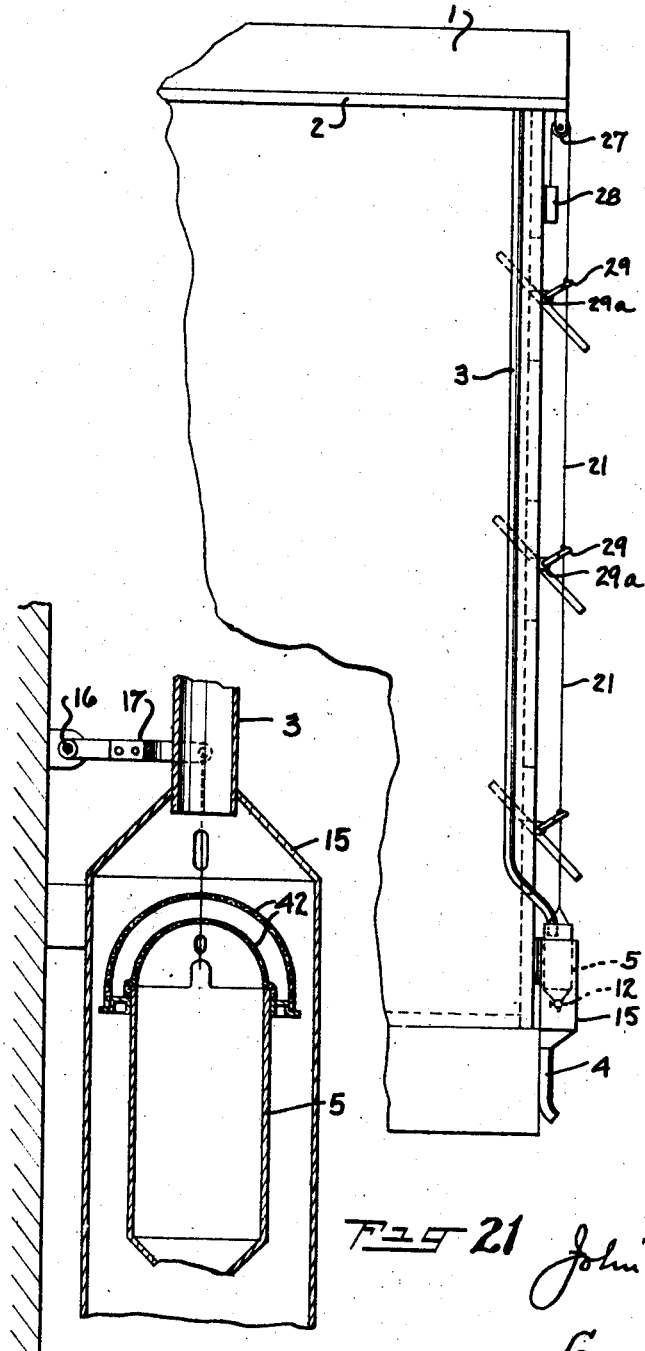
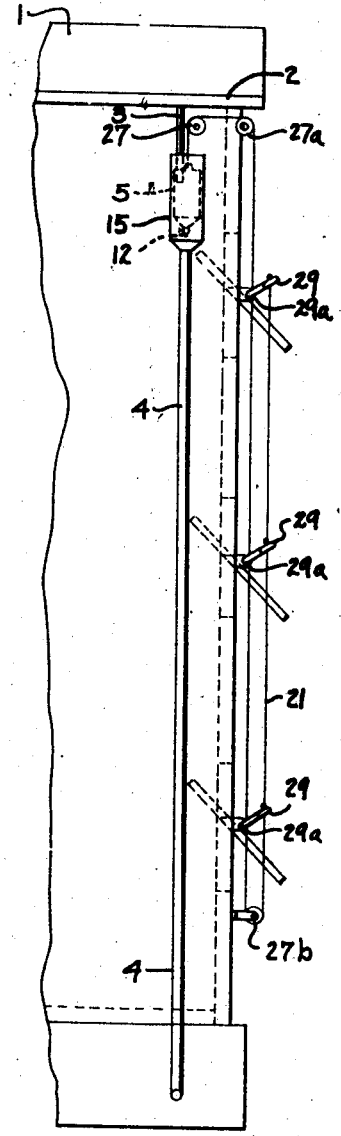
John L. Stowers, INVENTOR,
BY Samuel J. Watson
ATTORNEY

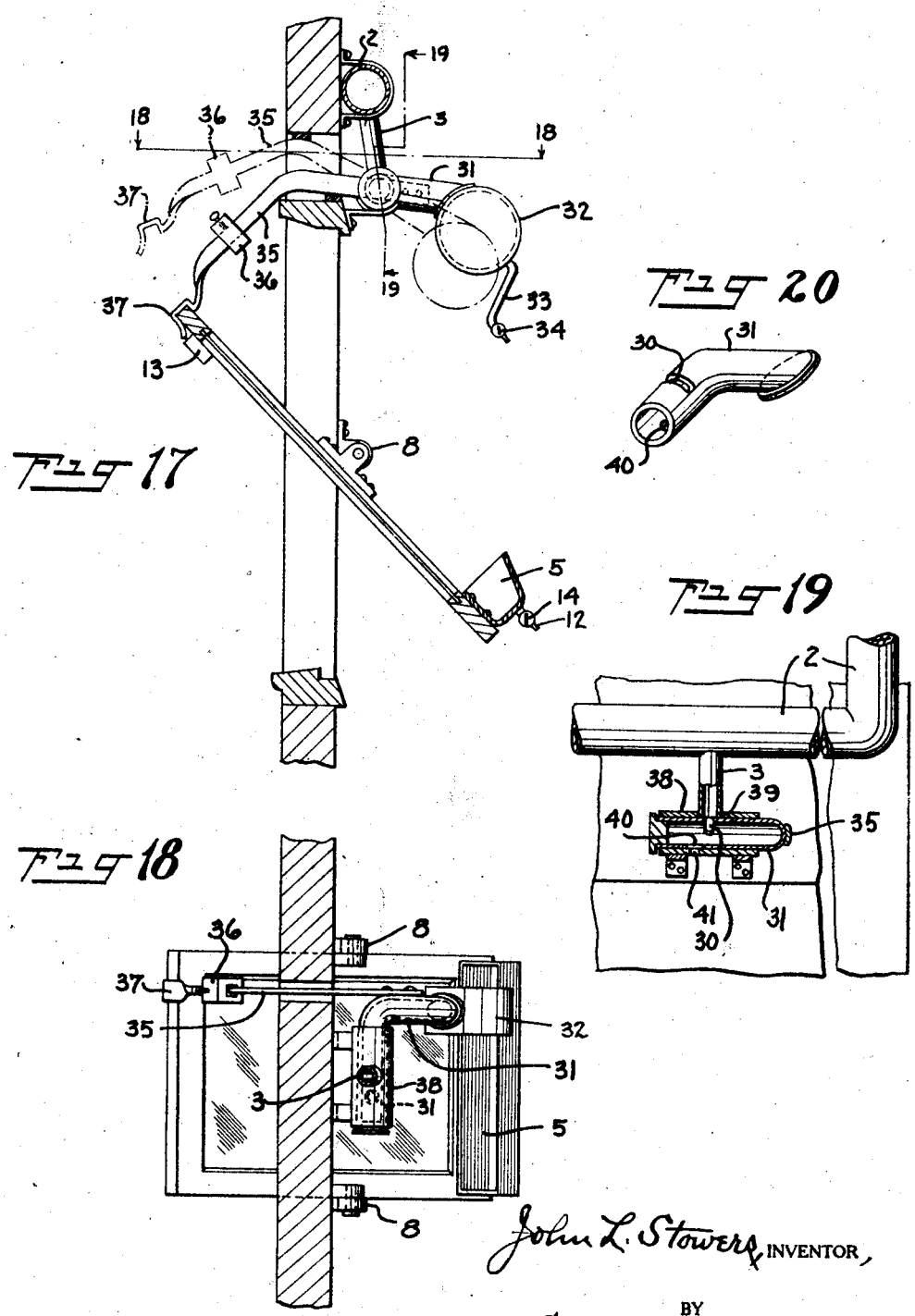

Patented May 10, 1927.

1,627,580

UNITED STATES PATENT OFFICE.

JOHN L. STOWERS, OF HABANA, CUBA.

DEVICE FOR OPENING AND CLOSING WINDOWS, SHUTTERS, AND SIMILAR APPLIANCES.

Application filed July 26, 1924. Serial No. 728,514.

My invention relates to a mechanism by which windows, shutters, doors, and other similar appliances are closed by the application of the weight of a liquid or fluid utilized as the power or force for closing such windows, shutters, doors, etc., and upon the automatic removal of such weight said windows, shutters, doors, etc., are opened by force of gravity.

The objects of my device are to provide means whereby windows, shutters, doors, etc., may be closed or opened upon the occurrence of any pre-determined conditions, or at any pre-determined time, as for instance when rain begins to fall and opened when rain ceases, and these objects are obtained by the automatic use of the weight of the rain for closing the windows, shutters, doors, etc., when rain begins to fall, and means for automatically removing said weight when rain ceases to fall and thereby permitting said windows, shutters, doors, etc., to be opened by the force of gravity.

I obtain these objects by the mechanism illustrated in the accompanying drawings in which—

Fig. 1 shows a front elevation of a section of roof and wall of a building provided with windows, shutters, etc., to which is applied one form of my invention; Fig. 2 shows a side elevation of the structure shown in Fig. 1 on the lines 2—2 of Fig. 1, with the window, shutter, etc., open; Fig. 3 shows the same structure as Fig. 2 with the window, shutter, etc., closed;

Fig. 4 shows a modified form of my invention applied to a window, shutter, etc., on a side elevation of a building; Fig. 5 shows a section of the structure shown in Fig. 4 on the lines 5—5; Fig. 6 shows a section of the structure shown in Fig. 4 on the lines 6—6; Fig. 7 is a plan view of Fig. 6 on the lines 7—7;

Fig. 8 is a slightly modified form of the structure shown in Fig. 4 where my invention is applied to two or more windows, shutters, etc., on the same horizontal; Fig. 9 shows a section of Fig. 8 on the lines 9—9; Fig. 10 shows a plan view of Fig. 8 on the lines 10—10;

Fig. 11 shows another slightly modified form of my invention for opening and closing windows, shutters, etc., which are pivoted at top and bottom; Fig. 12 is a plan view of Fig. 11 on the lines 12—12;

Fig. 13 is another modified form of my invention for closing windows and shutters which move perpendicularly; Fig. 14 is an enlarged detailed view of the operating means shown in Fig. 13;

Fig. 15 shows my invention adapted to open and close a perpendicular line of windows, shutters, etc.; Fig. 16 is a slightly modified form of my invention as shown in Fig. 15;

Fig. 17 shows a side elevation of a section of roof and wall of a building provided with a preferred form of my invention; Fig. 18 is a plan view of the structure shown in Fig. 17 on the lines 18—18; Fig. 19 is a detailed view, partly in section, of portions of the structure shown in Fig. 17 on the lines 19—19; Fig. 20 is an enlarged perspective view of a portion of the structure shown in Fig. 17.

Fig. 21 is an enlarged detailed view of a portion of the leader in which is installed one form of the receptacle, 5.

Similar letters and numerals refer to similar parts throughout the several views.

In the forms of my invention shown in the several figures, the roof, 1, is provided with the usual gutter, 2, for the discharge of rain water falling on the roof.

The gutter, 2, is provided with an orifice, 3a, to which is connected a leader or pipe, 3, leading to a receptacle, 5, or a pipe, 4, (as shown in Fig. 1) may be connected as at 6 with the usual leader. The receptacle, 5, in the form shown in Fig. 1 is preferably in the shape of a tube secured in bearings, 7, passing along or below the bottom of one or more of a horizontal line of windows or shutters which swing on bearings, 8. The bottom of the swinging windows are detachably connected to the receptacle, 5, by the catch or sliding bolt, 9, which may be operated from the inside of the window by the knob, 10. A weight, 13, may be attached to the inside of the upper portion or sash of the window or shutter, either directly or by an arm, 11, or the window or shutter may be pivoted slightly below its horizontal centre, in which construction the heavier weight of that portion of the window or shutter above the pivots will tend normally to open the window or shutter and keep it open.

The receptacle, 5, is provided with one or more drip-openings, 12, having stop-cocks, 14, for draining the receptacle, 5. The receptacle, 5, in the form shown in Figs. 4, 6, 8, 11, 15 and 16 is suspended within an enlarged portion, 15, of the leader, 3. The top of the receptacle, 5, is preferably covered with screens of metal or other suitable material, as shown in Fig. 21. The bottom of the receptacle, 5, is preferably funnel-shaped, and is provided with a drip-opening at the bottom of the funnel for the discharge of the liquid from the receptacle, 5, and with a stop-cock for regulating such discharge. In the form shown in Figs. 4, 6 and 8 the receptacle, 5, is secured to a rod, 16, by the arm, 17, the rod, 16, passing horizontally through or across the front or back of the window or shutter. To the rod, 16, are secured the arms, 18, by the screw-bolt, 19, and the arms, 18, are secured to the frames of the window or shutter at 20 (Fig. 9).

In the modified form shown in Figs. 11 and 12, the receptacle, 5, is secured to one end of the cord, 21, which passes over pulleys, 22, 23, and to the other end of the cord is attached the weight, 24. To the top of the windows, shutters, etc., is attached the arm, 25, the outer end, 26, of which is detachably secured to the cord, 21.

In the form shown in Figs. 13 and 14, the window, shutter, etc., moves perpendicularly and the receptacle, 5, is secured to the lower side of the window or shutter; when the receptacle, 5, fills with water the weight of the water closes the window or shutter.

In Fig. 15 the receptacle, 5, is shown as secured to one end of a wire cord, 21, which passes over the pulley, 27; to the other end of the cord, 21, is attached the weight, 28. The cord, 21, is detachably secured to the arms, 29, which in turn are secured to the windows, shutters, etc., as at 29ª. Fig. 16 shows a slight modification of the structure shown in Fig. 15, the cord, 21, passing over the pulleys, 27ª and 27ᵇ.

In Figs. 17 and 18, the window or shutter is pivoted at 8. The pipe, 3, discharges into the opening, 30, in the inner tube, 31, which leads to the receptacle, 32, which has an outlet, 33, provided with a stop-cock, 34. The receptacle, 5, is secured to the bottom of the window, shutter, etc., and is provided with an outlet, 12, and a stop-cock, 14. The receptacle, 32, is connected with the arm, 35, which extends to the interior of the building and is provided with a weight, 36, and a catch or clasp, 37. Surrounding the inner tube, 31, is a tube, 38, whose interior circumference is substantially the same size as the exterior circumference of the inner tube, 31, but of a suitable size to permit the inner tube, 31, to revolve within the tube, 38. The tube, 38, has an opening, 39, into which the pipe, 3, extends, as shown in Fig. 19. The inner tube, 31, has an opening, 40, which is opposite to the opening, 41, in the tube, 38, when the parts are in the position shown in the solid lines in Fig. 17; the inner tube, 31, closes the opening, 41, in the tube, 38, when the parts are in the position shown by the dotted lines in Fig. 17.

The operation of my device is as follows:

Assuming that the window is open, as shown in Fig. 2, and is held in that position by the counterweight, 13, which tends to cause the top portion of the window or shutter to move inward and whose further movement is prevented by the beveled end of the strips, 13ª, which serve as supports or blocks to the opened window or shutter. When rain falls the water flows down the slope of the roof, 1, to the gutter, 2, and into the pipe, 3, and to the receptacle, 5, which rapidly fills with water. The weight of the liquid contained in the receptacle, 5, as the receptacle fills, counter-balances and overcomes the inertia of the window or shutter and the weight, 13, and the weight of the liquid in the receptacle, 5, will cause the window or shutter to close, and take the position shown in Fig. 3. As long as the rain continues, the receptacle, 5, will continue filled with rain water and the window or shutter will maintain its closed position. When the rain ceases, water will cease running into the receptacle and the receptacle will be slowly emptied through the drip-openings, 12. These drip-openings, 12, may be one or more and may be arranged of such size and number as to empty the receptacle, 5, in any desired period of time, and the time within which the receptacle, 5, may be emptied may be regulated by the stop-cock, 14, and by the size and number of the drip-openings, 12. As soon as the receptacle, 5, is emptied through the drip-openings, 12, the counterweight, 13, will cause the window or shutter to open and take the position shown in Fig. 2. If and as desired the window or shutter may be secured in either a closed or open position by a positive fastening, as is customary.

In the form of my device shown in Figs. 4, 6, 8 and 11 the operation is substantially the same as already described. When it rains, the water from the gutter, 2, passes by the tube, 3, to the receptacle, 5, which quickly fills with water. The weight of the water causes the receptacle, 5, to drop into the position shown in Figs. 4, 6 and 8, thereby closing the window or shutter (Fig. 5). When the rain ceases, water will cease running into the receptacle, 5, and the receptacle, 5, will be slowly emptied through the drip-openings, 12. As soon as the receptacle, 5, is emptied through the drip-openings, 12, the counterweight, 13, will cause the window or shutter to open and take the position shown in Fig. 2, and the arm, 17, will take the position shown by the dotted lines in Fig. 6.

By the same method of operation the windows, shutters, etc., shown in Fig. 11 are closed when rain begins to fall and are opened when the rain ceases, the counterweight, 24, (Fig. 11), and the counterweight, 28, (Figs. 15, 16), operating as the equivalents of the counterweight, 13 (Fig. 2).

In the modification of my device shown in Figs. 17 and 18, water from the gutter, 2, passes through the pipe, 3, through the orifice, 30, and connecting pipe, 31, to the receptacle, 32, also through the orifice, 41, from which it falls into the receptacle, 5. As soon as the receptacles, 5 and 32, are filled with water, receptacle, 32, takes the position shown in the dotted lines in Fig. 17, releasing the catch, 37, which takes the position shown in the dotted lines in Fig. 17. The weight of the water in receptacle, 5, causes the window or shutter to close. The water dripping from the receptacle, 32, through the drip, 33, when the window or shutter is closed, falls into receptacle, 5, and keeps the receptacle, 5, filled, taking the place of the water dripping from receptacle, 5, through the drip, 12. When the rain ceases the drip-openings, 33 and 12, empty the receptacles, 32 and 5, respectively, and when these receptacles are empty the window or shutter opens and takes the position shown in Fig. 17 and is secured in the open position by the catch or hook, 37, as shown in Fig. 17. When the receptacle, 32, is filled, it moves to the position shown in the dotted lines of Fig. 17, revolves the inner tube, 31, closes the orifice, 41, and stops the flow of water through orifices, 40 and 41. A horizontal bar or rod may be secured to a horizontal line of windows, one of which is operated by the structure shown in Fig. 17, whereby when one window is closed by the mechanism shown in Fig. 17 its movement closes the horizontal line of windows, shutters, etc., secured to such horizontal rod.

A preferred form of installing the receptacle, 5, is shown in Fig. 15 where the top of the receptacle is covered by one or more screens, 42. It is also desirable to insert a screen, 43, in the gutter, 2, to cover the orifice where the leader, 3, connects with the gutter, 2, as shown in Figs. 1 and 4.

In the construction shown in Figs. 4, 5, 8 and 9, the rod 16 may be set out from the window, shutter, etc., as shown in the dotted lines in Fig. 5, or the rod, 16, and the arms, 18, may be installed either on the outside or the inside of the building, and in either case their operation is the same.

In the foregoing description of the operation of my device, I have employed rain water as the liquid operating medium, but it is obvious that any liquid may be used and other water than rain water may be employed. For example, my device may be utilized for the closing of windows or shutters at night or for the operation of fire shutters and the liquid operating medium may be water from a tank on the roof, from a pump, or any other source of supply and my device put into operation for the closing of such shutters in the event of danger from fire, or other cause, or at any time desired. It is also obvious that my device may be made operative for closing windows and shutters at any predetermined time, or under any predetermined conditions of weather, temperature, etc., by supplying a liquid operating medium from a tank, pump, or other source of supply through the operation of a clock mechanism, thermostat, electric current, electric fuse, or other similar devices.

I claim:

A device for opening and closing windows, shutters, and similar appliances, consisting of a vertically movable liquid-holding container installed in the drain leader pipe of a building, said container being secured to a lever arm attached to a horizontally pivoted window, shutter, etc., said container having near its bottom a controlled discharging outlet.

JOHN L. STOWERS.